Jan. 23, 1923.
P. PASQUARIELLO.
DRAFTSMAN'S SCALE.
FILED FEB. 8, 1922.
1,443,088
2 SHEETS-SHEET 2
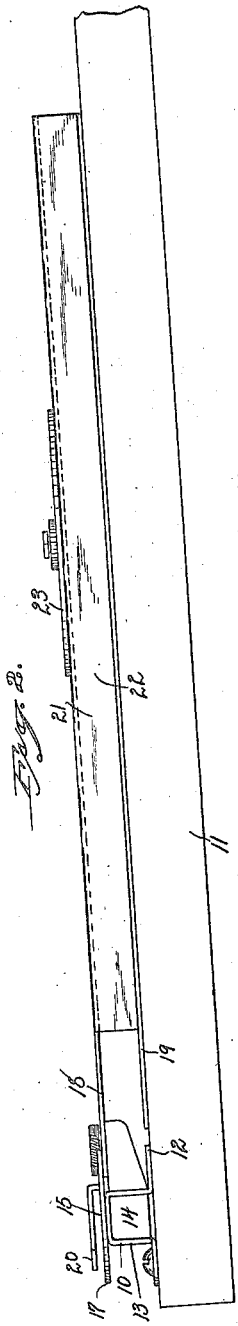
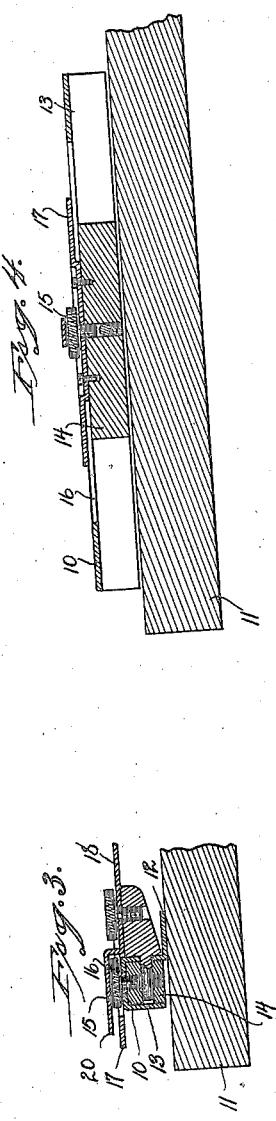
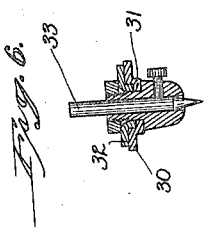
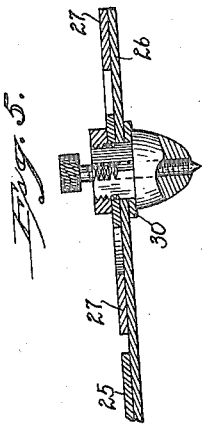
Inventor.
Pasquale Pasquariello
by Seymour & Earle
Attys Patented Jan. 23, 1923.

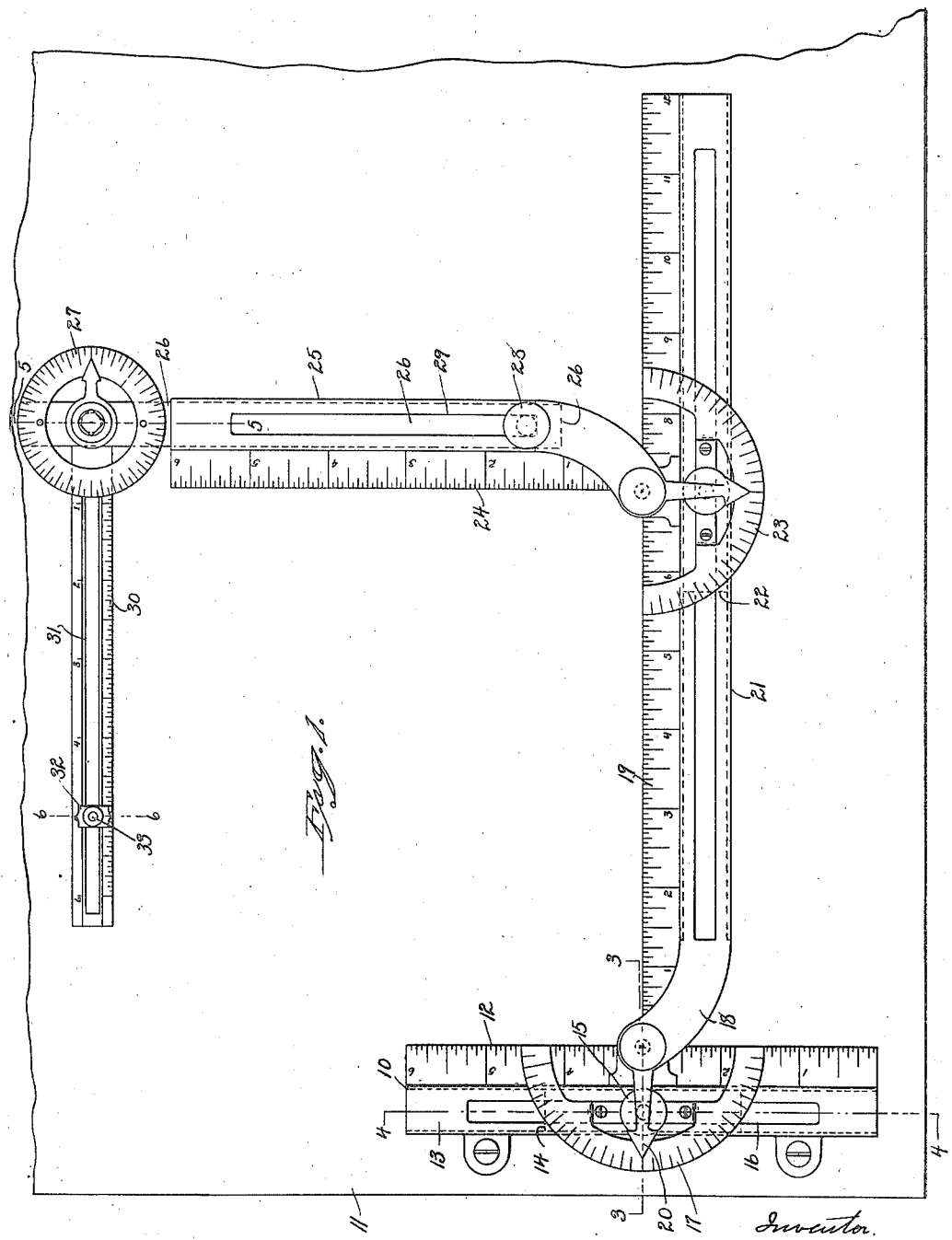

1,443,088

UNITED STATES PATENT OFFICE.

PASQUALE PASQUARIELLO, OF NEW HAVEN, CONNECTICUT.

DRAFTSMAN'S SCALE.

Application filed February 8, 1922. Serial No. 534,985.

*To all whom it may concern:*

Be it known that I, PASQUALE PASQUARIELLO, a subject of the King of Italy, residing at New Haven, in the county of New Haven and State of Connecticut, have invented a new and useful Improvement in Draftsmen's Scales; and I do hereby declare the following, when taken in connection with the accompanying drawings, and the characters of reference marked thereon, to be a full, clear, and exact description of the same, and which said drawings constitute part of this application, and represent in—

Fig. 1 a plan view of a draftsman's scale constructed in accordance with my invention.

Fig. 2 an edge view of the same.

Fig. 3 a sectional view on the line 3—3 of Fig. 1.

Fig. 4 a sectional view on the line 4—4 of Fig. 1.

Fig. 5 a sectional view on the line 5—5 of Fig. 1.

Fig 6 a sectional view on the line 6—6 of Fig. 1.

This invention relates to improvement in draftsman's scales, and particularly to scales which are adjustable to various positions, so that any desired angles may be readily found, the object of the invention being a simple construction of parts, whereby they may be readily and accurately formed from metal, and the invention consists in the construction as hereinafter described and particularly recited in the claims.

In carrying out my invention, I employ a base-member 10 adapted to be permanently secured to a drawing-board or table 11. This includes a straight, graduated edge 12 and a housing 13 containing a sliding block 14, which may be fixed in place by means of a set-screw 15 extending through a clearance-slot 16. Secured to the block 14 is a segmental scale 17. Pivotally mounted in the block 14 is the tongue 18 of a ruler 19, which, for convenience, we will call the "horizontal" ruler, to which is fixed a pointer 20 adapted to sweep the scale 17. The horizontal ruler 19 also includes a housing 21, containing a sliding block 22 and a segmental scale 23 secured to the block 22 and pivotally mounted in the block 22 is a vertical ruler 24, in the housing 25 of which is a slide 26 carrying at its outer end a circular graduated disk 27, this slide 26 being adjustably secured in the housing 25 by means of a set-screw 28 which travels in a longitudinal slot 29. Pivotally connected with the slide 26 is a scale 30, which, for convenience, we will call a "radial" scale. This scale is formed with a longitudinal slot 31 mounting a pencil-carrier 32 supporting a pencil 33. The horizontal ruler may be moved up or down with relation to the base 10 and turned to any desired angle with relation thereto. The vertical ruler 24 may also be turned to the desired angle to the horizontal ruler, and the radial scale may be readily adjusted in the vertical ruler, and the pencil-point adjusted in the radial scale.

I thus provide three adjustable rulers, all connected with a single base and each adjustable with relation to the other, so that lines at any desired angle may be drawn and the rulers readily adjusted for section lining or other work commonly performed by draftsmen.

I claim:

1. A draftsman's scale, comprising a base, including a straight edge, and a housing formed with a clearance slot, a block in said housing and a segmental scale secured to the said block, and a horizontal ruler adjustably connected with said block and provided with a pointer adapted to sweep said segmental scale.

2. A draftsman's scale, comprising a base, including a straight edge, a housing, a block in said housing and a segmental scale secured to the said block, a horizontal ruler adjustably connected with said block and provided with a pointer adapted to sweep said segmental scale, said horizontal ruler comprising a straight edge, a housing, a block longitudinally movable in said housing, and a segmental scale secured to said block, a vertical ruler pivotally connected with said block and provided with a pointer adapted to sweep the segmental scale in the horizontal ruler.

3. A draftsman's scale, comprising a base, including a straight edge, a housing, a block in said housing and a segmental scale secured to the said block, a horizontal ruler adjustably connected with said base and provided with a pointer adapted to sweep said segmental scale, said horizontal ruler comprising a straight edge, a housing, a block longitudinally movable in said housing, and a segmental scale secured to said block, a vertical ruler pivotally connected with said block and provided with a pointer adapted to sweep the segmental scale in the horizontal ruler, the said vertical ruler comprising a straight edge and a housing, a slide longitudinally movable in said housing, a graduated dial carried by said slide, a radial scale adjustably connected with said slide, and a pencil longitudinally adjustable in said radial scale.

In testimony whereof, I have signed this specification in the presence of two subscribing witnesses.

PASQUALE PASQUARIELLO.

Witnesses:
FREDERIC C. EARLE,
MALCOLM P. NICHOLS.